Patented Aug. 9, 1932

1,870,614

UNITED STATES PATENT OFFICE

ALEXANDER EIBNER, OF MUNICH, GERMANY, ASSIGNOR TO THE FIRM THEODOR KOTTHOFF, OF COLOGNE RADERTAL, GERMANY

DRYING OIL

No Drawing. Application filed May 1, 1930, Serial No. 449,059, and in Germany September 7, 1929.

This invention relates to a method of preparing improved drying oils and to the products so obtained.

It is known that natural oil films depending upon the composition and derivation of the oils from which they are obtained possess in varying degrees, the disadvantageous properties of taking up water, of shrinking and of partially saponifying. These properties result from the natural oil undergoing oxidation while drying. For a like reason, blown oils also dry abnormally.

The highly unsaturated glycerides in the natural oils are the substances which cause drying of the oils. At the same time, it is these substances which undergo auto-oxidation and cause the undesirable properties above mentioned. These substances, accordingly, while they give to the oils, the valuable property of quick drying are nevertheless detrimental because of the disadvantages arising from their auto-oxidation.

It can thus be realized that the value of a true normal weather and iron protecting paint depends largely upon the degree to which auto-oxidation can be repressed, the ideal paint logically being one in which auto-oxidation is entirely eliminated.

The study of the colloidal aggregation of some synthetic unsaturated compounds such as styrene, vinylester, or the like by heat-polymerization has shown, that colloids so produced differ from natural oil-films in that in their formation, the oxygen of the air takes no part. Therefore these compounds are not hygroscopic, do not shrink, and lack saponifying capacity. Moreover a direct relation has been found to exist between the degree of polymerization of these compounds and their passage in to insolubility.

For removing the afore-mentioned defects of the natural oil films, one should produce a way of drying, in which polymerization plays the chief part. At ordinary temperature, this kind of drying does not occur, because in the fatty oils, the double bonds are more susceptible to the oxygen of the air than to the temperature. Therefore, the slow thickening of these oils at ordinary temperatures occurs through the formation of oxynes.

Therefore, to effect an improvement in the drying of natural oils it is necessary to form therefrom the typical stand-oils by polymerizing the oils at elevated temperatures with exclusion of air. It is only here that an analogy exists between the stand-oils and the polymeres of styrene and vinylester, as the stand-oils are also free from oxynes. In contrast to the fresh oils, stand-oils are iso-colloids in that they contain the polymerized least dispersed phases distributed in the highly dispersed phases. They thus differ in solubility.

It was found that the least dispersed phases of stand-oils, that is the products of polymerization of the highest unsaturated oil-glycerides due to their prominent drying capacities, are the most precious ingredients of the commercial stand-oils. Further that these least dispersed phases do not show the disadvantages of application of the fresh oils noted above. I accordingly, found that the drying of the oils was best improved by converting them into stand-oils in such a way as to obtain the highest possible yield of said least dispersed phases. These phases are then quantitatively separated from the highly dispersed phases which do not dry suitably. The separated least dispersed phases are applied separately in dissolution as oil-lacquers, aiming as a medium of combining colors.

The highest yield of the aforementioned least dispersed phases in oils is usually produced by rapidly heating said oils, while introducing carbonic acid, to a temperature of about 270° to 320° C. For linseed oil, the temperature is maintained at about 300° to 320° C., while for poppy and wood oils the temperature is usually lower. The carbonic acid is employed to drive off the adsorbed air. The temperatures are maintained until the end of the preparation in the carbonic acid stream. In this preparation heating takes place to a point surpassing the disappearance of the hexabromide reaction when employing linseed oil and the elaostearin and linol acid reactions when employing wood and poppy oils respectively.

The quantitative separation of the differently dispersed phases is not attainable, either er by boiling with an hydrocarbon, or with acetone, because an intermediate solution of all the ingredients of the stand-oils is necessary, in order to carry out the separation. This separation is effected out in the following manner: The previously mentioned most highly viscous stand-oils are put into solution by heating in alcohols, esters or in mixtures of these solvents. During the cooling, the least dispersed phases fall out quantitatively, the highly dispersed ones remaining in solution.

The esters most suitable for this separation, according to the kind of oil used, are malonic ester, ethyl acetate, ethyl butyrate and glycol-acid-butyl-ester.

The relative technical values of the least and highly dispersed stand-oil phases are the following:

I.—The least dispersed phases descend from the most unsaturated oil glycerides and are obtainable after the mentioned treatment of linseed oil in a yield of up to 80%, of wood oils up to 85%, as highly viscous, clear yellow, stringy masses. They are soluble in chloroform, butylacetate, amylacetate, oil of terpentine, sangajol, tetralin, dekalin and hexalin. They are pure tri-glycerides and therefore show the lowest acid numbers and normal saponifying numbers. Their distinguishing mark of quality is their extremely difficult saponifying ability. Therefore they distinguish themselves advantageously from the fresh oils, varnishes, and blown oils in reference to weather resisting ability of their films. This particularity of the least dispersed standoil-phases is a result of their high colloidal aggregation.

The upstrokes of these least dispersed standoil-phases are free from stickiness in twenty-four hours; the mentioned phases of wood oil in two hours; those of a mixture of 70% linseed- and 30% wood- oil in three and one-half hours. The solutions of these least dispersed phases in oil of turpentine, sangajol, etc., may be used as quick driers without the disadvantages of the hitherto existing ones.

It was found that the films of the least dispersed phases from the mentioned linseed-, poppy- and wood- oils are more brilliant, thicker and harder, than those of the fresh and blown oils and the usual commercial standoils.

The films of these phases show the further advantage of application of not softening, because they contain no highly dispersed phases.

Therefore the observed treatment is also useful for preventing the softening of linoleum, i. e. for the improvement of linoleum.

The greatest painting advantage of the observed treatment for the fabrication of weather and iron protecting paints is the lack of hygroscopicity of the above-mentioned least dispersed phases. Their films turned water for a year and a half without becoming noticeably dull. Their solubility in water is negligible.

Therefore the kind of drying of these least disperse phases is technically better than that of the commercial standoils and much more perfect than that of the blown and fresh oils. This treatment is also economical, because it permits of obtaining yields of the least dispersed phases of up to 85%.

II.—The highly dispersed phases: In the prevailing commercial stand-oils, the number of highly dispersed phases out-weighs noticeably the number of the lesser dispersed phases. The first are the group of the lesser polymerized and unpolymerized, least unsaturated primitive oily glycerides, and decomposed free fatty acids. They combine therefore, in themselves, the inferior ingredients of the oils with exhausted products. On account of this, they possess high acid reactions and great saponifying capacities. They dry slowly, remain sticky, and cause the long stickiness of most of the commercial oils. Their films are very hygroscopic, and strongly shrinking.

By this method it is possible to obtain the most technically valuable, least dispersed stand-oil phases in very high yields and free from damaging highly dispersed phases.

Said least dispersed stand-oil phases owing to their better drying, are more efficient than fresh oils, blown oils, varnishes, thin and thick stand-oils. Therefore, they may substitute varnishes for the manufacture of meliorated linoleum of stone protecting liquids and of oil-paints respectively, may be available as supplements to those oils, and to non oily cements, such as nitro-cellulose caseine, or the like.

They are of particular utility in forming valuable oil paints and enamel paints, heat and weather resisting paints, iron protecting paints, art oil paints, emulsions and paints with combined, oil cements.

The following examples will serve to more clearly illustrate the nature of my invention.

*Example I*

Isolation of the least dispersed phases: To a quantity of 400 gms. of hot linseed-standoil while slowly stirring are added, 800–1200 gms. of malonic ester. The stand-oil goes entirely into solution. Still more simply the hot stand-oil may be allowed to run into 800–1200 gms. of the solvent, with constant stirring whereupon complete solution takes place. Upon cooling, from 100° to 70° C., the least dispersed phases separate out. At ordinary temperatures, the precipitation becomes quantitative. The higher dispersed phases remain dissolved and are removed in the ordinary way.

*Example II*

Isolation of the least dispersed phases from 400 gms. of wood standoil is made as in Example I by treatment with i-amyl alcohol.

*Example III*

Isolation of the least dispersed phases from a mixture of wood and linseed stand oils may be effected according to Example II. These phases dried in thin sheets upon glass without stickness in three and one-half hours.

*Example IV*

150 gms. of poppy oil, after rapid heating in a carbonic acid stream, are held for nine hours at 300° C. The isolation of the least dispersed phases is then carried out according to Examples II and III.

What I claim is:

1. The process of obtaining a quick drying oil capable of forming a non-shrinking non-hygroscopic film, which comprises heating a fatty oil to a temperature of 270 to 320° C. in the absence of oxygen to polymerize said oil into a stand-oil, iso-colloidal in form, and containing two differently dispersed phases, the lesser dispersed phase of which is distributed in the higher dispersed phase, dissolving said colloid in an organic solvent and cooling the solution to precipitate said lesser dispersed quick drying phase.

2. The process of obtaining a quick drying oil capable of forming non-shrinking, non-hygroscopic films which comprises heating a fatty oil to a temperature of 270° to 320° C. while forcing an inert gas therethrough, to polymerize said oil to a stand-oil, iso-colloidal in form, and containing two differently dispersed phases, the lesser dispersed phase of which is distributed in said higher dispersed phase, adding to said colloid an organic solvent selected from the class consisting of aliphatic alcohols and esters and cooling the resulting solution to effect a precipitation of the quick drying lesser dispersed phase.

3. The process for obtaining a quick drying oil capable of forming a non-shrinking, non-hygroscopic film which comprises removing oxygen from a fatty drying oil, heating said oil in the presence of carbon dioxide to a temperature of between 270 and 320° C. to effect a polymerization of said oil to a stand-oil, iso-colloidal in form, and containing two differently dispersed phases, the lesser phase of which is distributed in the higher dispersed phase, adding an aliphatic ester to said colloid and cooling the resulting solution to precipitate the quick drying lesser dispersed phase.

4. The process of obtaining a quick drying oil capable of forming a non-shrinking, non-hygroscopic film which comprises rapidly heating linseed oil to a temperature of 300 to 320° C. while forcing carbon dioxide therethrough, until said oil no longer gives a hexa-bromide reaction to thereby polymerize said oil to a stand-oil, iso-colloidal in form, and containing two differently dispersed phases, the lesser dispersed phase of which is distributed in the higher dispersed phase, adding malonic ester to said colloid to dissolve the same and cooling the solution to precipitate said lesser dispersed, quick drying phase.

5. A quick drying oil having substantially no saponifying capacity and capable of forming films which are non-hygroscopic and non-shrinking, comprising a product obtainable by rapidly heating linseed oil to a temperature of 300 to 320° C. in the presence of carbon dioxide until the oil no longer gives a hexa-bromide reaction to produce an iso-colloid containing two differently dispersed phases, the lesser dispersed phase being distributed in the higher dispersed phase, dissolving said colloid in malonic ester, and cooling the solution to precipitate the lesser dispersed quick drying phase.

In testimony whereof I hereunto affix my signature.

DR. ALEXANDER EIBNER.